United States Patent [19]

Erickson

[11] Patent Number: 4,846,240

[45] Date of Patent: Jul. 11, 1989

[54] HIGH COP ABSORPTION HEAT PUMPED EVAPORATION METHOD AND APPARATUS

[76] Inventor: Donald C. Erickson, 627 Ridgely Ave., Annapolis, Md. 21401

[21] Appl. No.: 95,320

[22] Filed: Sep. 10, 1987

[51] Int. Cl.[4] .......................... B01D 1/06; F25B 15/00
[52] U.S. Cl. ...................................... 159/24.2; 159/46; 159/47.1; 62/101; 62/476; 202/177; 202/183; 203/100; 203/DIG. 4
[58] Field of Search ..................... 159/24.2, 13.2, 46, 159/17.1, 49, 47.1; 202/183, 182, 184, 177; 203/DIG. 4, 26, 24, DIG. 8, 100; 62/476, 101

[56] References Cited

U.S. PATENT DOCUMENTS

| | | | |
|---|---|---|---|
| 3,261,766 | 7/1966 | Sherwood | 203/11 |
| 4,209,364 | 6/1980 | Rothschild | 203/11 |
| 4,462,222 | 7/1984 | Sugimoto et al. | 62/476 |
| 4,475,361 | 10/1984 | Alefeld | 62/476 |
| 4,542,629 | 9/1985 | Biermann | 62/476 |
| 4,655,053 | 4/1987 | Kunugi et al. | 62/476 |
| 4,732,008 | 3/1988 | DeVault | 62/476 |

OTHER PUBLICATIONS

"Proceedings of the DOE/ORNL Heat Pump Conference: Research and Development on Heat Pumps for Space Conditioning Applications", CONF-841231, Aug. 1985, published by the Oak Ridge National Laboratory, Oak Ridge, TN, pp. 267, 268, 276, 293, and 294.

*Primary Examiner*—Wilbur Bascomb

[57] ABSTRACT

A high efficiency open-cycle absorptive approach to compressing steam or other vapor is disclosed, especially useful for industrial evaportion via recompression. Referring to FIG. 1, low pressure steam from evaporator 1 is absorbed in an aqueous absorbent solution so as to release heat in both absorber 7 and GAX exchanger 8. External heat is applied to generator 12. Steam at higher pressure is desorbed from both gnerator 12 and GAX exchanger 8, and used to heat evaporator 1. Absorber 7 heat is also used to heat and evaporate the mixture undergoing evaporation.

13 Claims, 2 Drawing Sheets

HIGH COP ABSORPTION HEAT PUMPED EVAPORATION METHOD AND APPARATUS

TECHNICAL FIELD

This invention relates to apparatus for concentrating aqueous solutions by evaporation. Examples include desalination of seawater, concentrating black liquor, and dewatering the stillage from beer distillation. The "open-cycle high-COP absorption heat pump disclosed herein" also has other applications.

BACKGROUND ART

In order to achieve reasonable energy economy most industrial evaporations are conducted with multiple effects (thermal drive) or with a steam compressor (electrical/mechanical drive). An example of multiple effect evaporation is disclosed in U.S. Pat. No. 3,884,767. Compression is disclosed in U.S. Pat. No. 3,234,109. Mechanical vapor recompression (MVR) usually incorporates only one stage of evaporation, thus keeping the required temperature lift and compression ratio very low. This results in a high Coefficient of Performance (COP), i.e., large quantity of water evaporate per unit of electrical input. Thermal evaporators achieve large COP with multiple effects; as a first approximation, the mass of water evaporated divided by the mass of driving steam supplied is equal to the number of effects.

A problem shared by both approaches to evaporation is that many feed materials are temperature sensitive, and must be limited to approximately 100° C. or lower. For example, seawater experiences excessive scaling at high temperature, and stillage contains proteinaceous material which breaks down under heat. The practical result is that both technologies operate either near or well below ambient temperature. With MVR, this requires a large and costly compressor. With multiple effects, all of the effects must be designed within the relatively narrow temperature range between 100° C. and ambient, imposing low temperature differences (large surface areas) and also requiring the lower temperature effects to operate deep in the vacuum region. Another disadvantage is that when the thermal heat supply is at high temperature, the high temperature availabilities cannot be used.

It has been disclosed in the prior art to apply absorption heat pumping to the evaporation process. In conventional closed-cycle absorption heat pumping, a COP (Coefficient of Performance) of about 1.7 is obtained from a single generator cycle, and 2.3 with a two-stage generator. Thus, the overall COP of the combination of evaporator plus absorption heat pump is the product of the two individual COPs. For example, a three-effect evaporator (COP≈3) combined with a single stage AHP (COP≈1.7) would be expected to have a COP of 5.1.

Example disclosures of applying absorption heat pumping to evaporation include U.S. Pat. Nos. 3,203,875, 3,261,766, 3,288,686, 3,692,634, 4,209,364, 4,350,571, and 4,379,734.

Both mechanical vapor recompression and absorptive vapor recompression are preferably done in an open cycle mode, to avoid the energy and capital expense of an extra heat exchanger temperature difference ΔT.

The problem with absorption heat pumped evaporation, which is not known to ever have been successfully applied, is that three more sizable heat exchangers are incorporated (absorber, desorber, and solution heat exchanger), and yet the COP is only increased by a factor of 1.7. Thus it is still necessary to have multiple evaporation effects, with the problems and expense they entail.

What would be desirable, and one objective of this invention, is an absorption cycle steam recompressor having a COP of at least 2.5, and preferably much higher, such that when it is applied to evaporation an acceptable overall COP can be obtained with only one stage of evaporation. The single evaporation stage can be at close to the highest allowable temperature, which keeps the pressure up and the cost down. If the three or four heat exchangers of the absorption cycle achieve a COP of 6, that is equivalent to an electric compression evaporator with a COP of 18, due to the higher cost of electricity and the thermal-to-electric conversion efficiency. The high efficiency absorption cycle evaporator would be as simple and reliable as a multi-effect evaporator, and less costly than either type of conventional technology at comparative efficiency level.

One absorption cycle known in the prior art to have a cycle COP greater than that of a single stage cycle is the "Generator-Absorber Heat Exchange" (GAX) cycle. A closed GAX cycle using the absorption working pair $NH_3$-$H_2O$ has been disclosed for residential and commercial heating applications by B.A. Phillips and also by R.A. Modahl and F.C. Hayes in the August 1985 Proceedings of the DOE/ORNL Heat Pump Conference-CONF-841231, Oak Ridge, Tennessee. In that cycle, a significant fraction of the generation heating is supplied by the hottest section of the absorption step. Thus only the remaining generation duty need be supplied by external heat. "In the heat pump art", "closed cycle" indicates that a separate hermetically sealed fluid is used in the heat pump, whereas "open cycle" indicates that some fluid from the process being heat pumped is incorporated directly into the heat pump.

DISCLOSURE OF INVENTION

Apparatus and process are disclosed for increasing the pressure of water vapor to a delivery pressure which is greater than the suction pressure by a multiplicative factor of about 2 or less, using a quantity of heat which is no more than about 45% of the latent heat content of said water vapor, comprised of:

(a) a generator which is supplied said heat plus partially concentrated aqueous absorbent solution, and which desorbs steam of at least said delivery pressure from said solution;

(b) a generator-absorber-heat-exchanger (GAX exchanger) which is supplied part of said suction pressure water vapor for absorption into concentrated absorbent solution from said generator, and which includes means for indirectly transferring the heat released thereby to diluted absorbent solution, thereby desorbing part of the delivery pressure water vapor from it;

(c) an absorber which is supplied the remaining suction pressure water vapor for absorption into partially diluated absorbent solution from the absorption section of said GAX exchanger, and which includes means for removing the absorption heat generated thereby; and (d) an absorbent solution pump for transporting dilute absorbent solution from said absorber, which is at the suction pressure of the water vapor, to the desorption side of said GAX exchanger, which is at the delivery pressure of said water vapor.

The low-lift absorptive steam recompression technique disclosed hereby is best adapted to industrial evaporations wherein an aqueous feed mixture is concentrated. The absorber heat can be used to produce additional delivery pressure water vapor by boiling feedwater, or it can heat part or all of the feedmixture. The external heat-driven desorption step can be a single generator as shown in FIG. 1, or can be the higher pressure generator of a two-stage generator as shown in FIG. 2. The external heating medium may be any convenient source: condensing steam, hot combustion or exhaust gas, a hot process stream, or even electric resistance heat.

The combination of a two-stage generator with a GAX cycle has general utility for low-lift (low pressure ratio) compression of any vapor, not just steam. For example, $NH_3$ or a light hydrocarbon gas could also be compressed, to a pressure ratio no higher than about 5 in the case of $NH_3$, or 4 in the case of other vapors. The two-stage desorber GAX cycle is also applicable in a closed cycle incorporating an evaporator and separate condenser, as well as to open cycles. Various arrangements of sensible heat exchange between cycle fluids may advantageously be incorporated, as known in the prior art. Any known means for indirect heat exchange may be employed in the absorber, GAX exchanger, and generator: vertical falling film, rising film, horizontal shell and tube, brazed plate fin, plate and frame, concentric type, scroll type, and other compact designs.

BEST MODE FOR CARRYING OUT THE INVENTION

Figure 1:
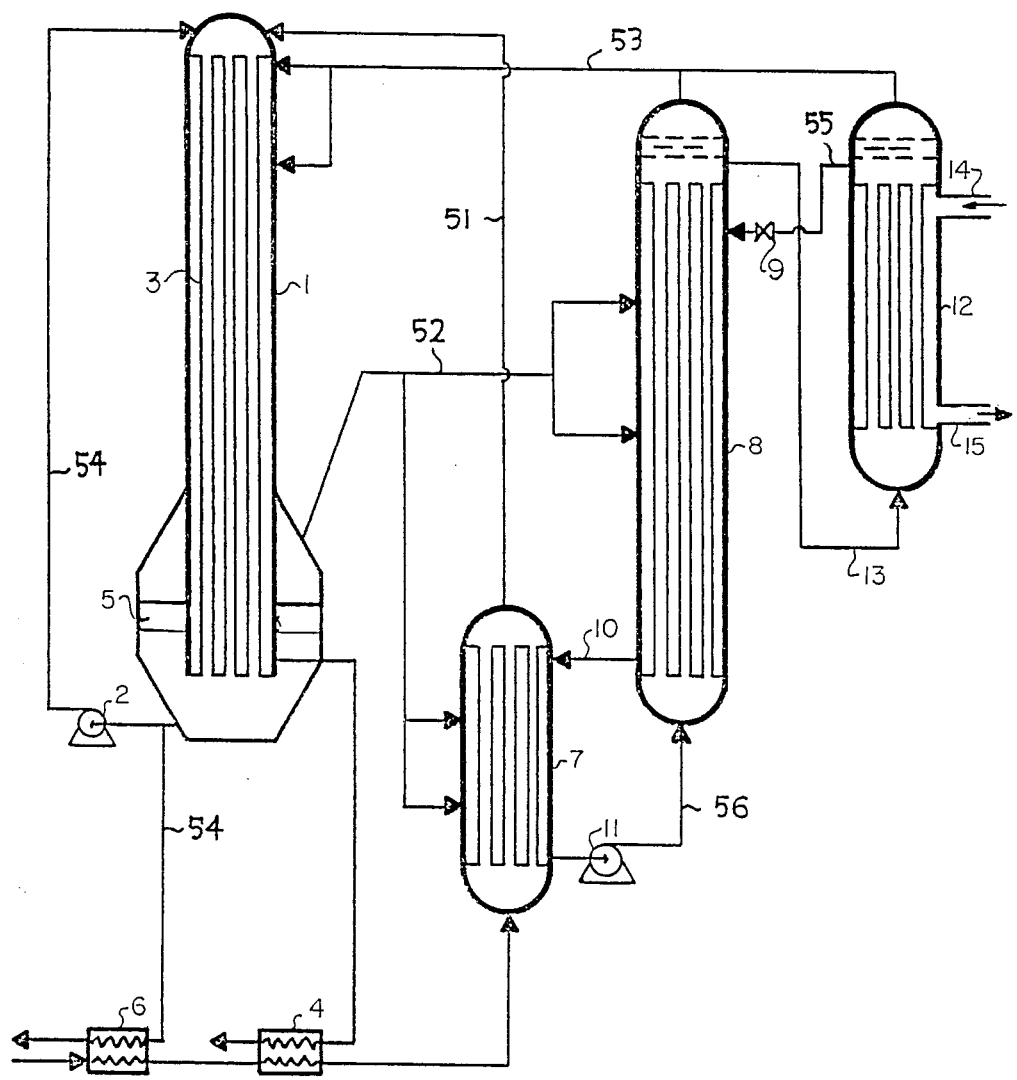
FIG. 1 is a schematic simplified flowsheet illustrating the combination of a single-effect evaporator (vertical-falling-film-type) plus an open GAX-cycle absorptive-steam compressor incorporating a single-stage generator.

Referring to FIG. 1, a single-effect evaporator 1 of falling film design has a pump 2 which circulates aqueous solution to the top of evaporation tubes 3, which are heated by steam. Condensed steam is withdrawn preferably through a sensible heat exchanger 4. The partially evaporated aqueous solution is separated into low-pressure water vapor which is withdrawn through a moisture separator 5 and concentrated aqueous mixture which is recycled and/or withdrawn via a sensible heat exchanger 6. The low pressure water vapor is split into two supply streams, one to absorber 7 and the other to generator-absorber-heat-exchanger (GAX exchanger) 8. Concentrated aqueous absorbent solution is supplied to the GAX exchanger 8 via means for pressure reduction 9 (a letdown valve or the like) to absorb low pressure water vapor therein, and the partially diluted aqueous absorbent resulting is supplied via line 10 to absorber 7 for absorbing the remaining low pressure water vapor. The heat of absorption produced in absorber 7 is transferred to any convenient cooling medium, for example preferably to the aqueous feed mixture en route to the evaporator 1. The dilute aqueous-absorbent solution resulting from the absorption occurring in absorber 7 is increased in pressure by solution pump 11 and fed to the higher pressure, higher temperature side of GAX exchanger 8. The absorption heat released on the low pressure side of GAX exchanger 8 is transferred to the absorbent solution on the higher pressure side, which is preferably flowing in countercurrent direction. The heat transfer causes steam at delivery pressure to desorb from the dilute absorbent, thereby partially concentrating the absorbent solution. The partially concentrated absorbent solution is then routed to generator 12 via line 13 for further desorption and concentration. External heat is supplied to generator 12 via connections 14 and 15. Concentrated absorbent solution is recycled to GAX exchanger 8 via letdown valve 9. Desorbed supply pressure steam from generator 12 and GAX exchanger 8 is combined and supplied to evaporator 1 as the heating medium therefor.

"Referring to FIG. 1, feed material for evaporator 1 is transported via heaters 6 and 4 and absorber 7 in means for transport 51, e.g., a conduit. Low pressure vapor (steam) evaporated from the feed material is routed to absorber 7 and GAX exchanger 8 via conduit 52. Higher pressure (delivery pressure) steam is withdrawn from generator 12 and GAX exchanger 8 via conduit 53 and routed to the heating side of evaporator 1. Concentrated feed material is withdrawn from evaporator 1 via conduit 54, for recycle by pump 2 and discharge via cooler 6. The aqueous absorbent solution circulates sequentially from the desorption component of GAX exchanger 8 to the generator 12 via conduit 13, then to the absorption component of GAX exchanger 8 via conduit 55, then to absorber 7 via conduit 10, and finally back to GAX exchanger 8 via pump 11 and conduit 56."

The preferred aqueous absorbent solution is a mixture comprised of $LiNO_3$, $KNO_3$, and $NaNO_3$ optionally admixed with $CsNO_3$ and/or $RbNO_3$. Evaporator pressures in the range of 10 kPa to 200 kPa are preferred, especially between 30 kPa and 150 kPa. Evaporator heat exchanger $\Delta T$ of less than about 10° C. is preferred, and typically about 6° C. or less. The COP of the open GAX cycle is strongly dependent on keeping that $\Delta T$ low, and for $\Delta T$ below 10° C. the COP readily exceeds 2.5. If the COP exceeds about 2.3, then the heat supplied to generator 12 will be less than about 45% of the heat delivered to the feed mixture and realized as condensate. For the above conditions, generator maximum temperature can range from 160° to 260° C.

The single-effect evaporator 1 may be of any known type, not limited to the vertical falling film type illustrated, and not even necessarily limited to only one effect. Similarly any known aqueous absorbent solution may be utilized, including LiBr, other alkali halides, mixtures of alkali hydroxides, mixtures of alkali thiocyanates, phosphoric acid, glycols, "alkali-nitrates, alkali nitrites," and the like.

Figure 2:
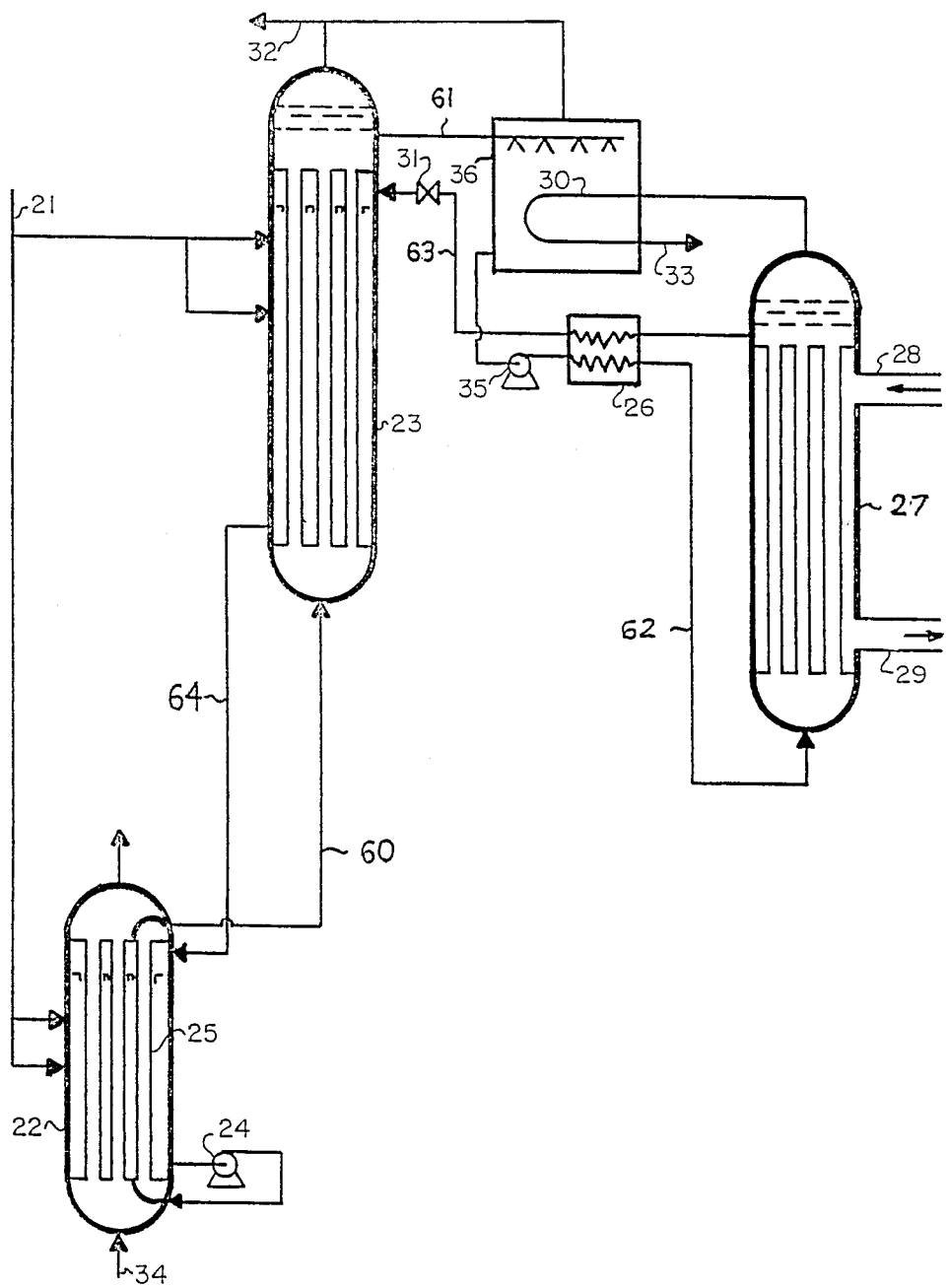
FIG. 2 illustrates the open GAX-cycle absorptive vapor compressor incorporating sensible heat exchange plus a two stage generator.

If heat is available at a substantially higher temperature than that necessary to drive the single stage generator GAX cycle, and provided the absorbent solution is compatible with the higher temperature, then the COP of the GAX cycle can be almost doubled over that of the single effect cycle by incorporating a second, higher pressure desorber (generator). FIG. 2 illustrates that embodiment. The vapor to be increased in pressure, at supply line 21, is divided and supplied to both absorber 22 and GAX exchanger 23 as before. Lower pressure absorbent solution pump 24 circulates dilute absorbent solution from absorber 22 to GAX exchanger 23, preferably via sensible heat exchanger 25, which may be incorporated directly in absorber 22 as shown, or may be located separately. Partly concentrated absorbent solution is routed from GAX exchanger 23 to supply pressure generator 36, where it is further concentrated. The resulting partially concentrated absorbent solution is further increased in pressure by high pressure solution pump 35, warmed in absorbent solution heat exchanger 26, and supplied to high pressure generator 27. Externally supplied heat may be applied to generator 27 via connections 28 and 29. Generator 27 is at a pressure sufficiently high that the saturation temperature of the desorbed vapor exceeds the temperature required by supply pressure generator 36. Thus vapor desorbed from generator 27 condenses in heating coil 30 to provide at least part of the desorption heat necessary in generator 36. If desired, heat remaining in the heating stream exiting connection 29 may also be applied to generator 36. The concentrated absorbent solution produced in generator 27 is cooled in exchanger 26, reduced in pressure by valve 31, and returned to GAX exchanger 23.

Pressurized vapor streams from GAX exchanger 23 and generator 36 are combined in a single delivery header 32. Condensate from coil 30 is withdrawn through line 33; it may be supplied to cool absorber 22 through line 34, thereby generating more delivery pressure vapor, or some other cooling medium may be applied. It will be apparent to the artisan that a third generator stage could also be added within the scope of this disclosure.

"Referring to FIG. 2, the absorbent solution circulates sequentially from absorber 22 to the desorption component of GAX exchanger 23 via pump 25 and conduit 61, then to high pressure generator 27 via pump 35 and conduit 62, then to the absorption component of GAX exchanger 23 via conduit 63, and then to absorber 25 via conduit 64."

What is claimed is:

1. Apparatus for increasing the pressure of water vapor from an initial pressure to a delivery pressure which is greater than the initial pressure by a factor of about 2 or less, using a quantity of heat which is no more than about 45% of the latent heat content of said water vapor, comprised of:
   (a) a generator;
   (b) a means for supplying an aqueous absorbent solution to said generator;
   (c) a means for supplying heat to said generator;
   (d) a means for withdrawing water vapor at a pressure at least as high as the delivery pressure from said generator;
   (e) a generator-absorber-heat-exchanger (GAX exchanger) having an absorption component and a desorption component which are in heat exchange relationship;
   (f) a means for supplying part of said water vapor at the initial pressure to said GAX exchanger absorption component;
   (g) a means for routing said aqueous absorbent solution from said generator to said GAX exchanger absorption component;
   (h) a means for withdrawing water vapor at said delivery pressure from said GAX exchanger desorption component;
   (i) an absorber;
   (j) a means for supplying the remaining part of said water vapor at the initial pressure to said absorber;
   (k) a means for routing said aqueous absorbent solution from said GAX exchanger absorption component to said absorber; and
   (l) a pump for routing said aqueous absorbent solution from said absorber to the GAX exchanger desorption component.

2. Apparatus according to claim 1 additionally comprised of:
   (a) an evaporator;
   (b) a means for feeding an aqueous feed mixture to said evaporator;
   (c) a means for supplying said water vapor at the delivery pressure to said evaporator as heating medium therefor;
   (d) a means for withdrawing the water vapor at the initial pressure from said evaporator and delivering it to said absorber and to said GAX exchanger; and
   (e) a means for withdrawing concentrated aqueous feed mixture from said evaporator.

3. Apparatus according to claim 2 further comprised of a means for cooling said absorber by exchanging heat with at least part of said aqueous feed mixture.

4. Apparatus according to claim 3 including means for supplying said aqueous absorbent solution from said GAX exchanger desorption component to said generator.

5. Apparatus according to claim 1 additionally comprised of a second generator at about said initial pressure; a means for heating said second generator at least in part by condensing the high pressure water vapor withdrawn from said first generator; plus a second solution pump which transports aqueous absorbent solution from said second generator to said first generator.

6. Apparatus according to claim 1 additionally comprised of a means for heating said aqueous absorbent solution from said absorber.

7. Apparatus according to claim 1 wherein said aqueous absorbent solution is comprised of $KNO_3$, $NaNO_3$ and $H_2O$.

8. Apparatus according to claim 1 wherein said aqueous absorbent solution is comprised of water plus at least one component selected from the list comprised of alkali halides, alkali hydroxides, glycols, phosphoric acid, alkali thiocyanates, alkali nitrates, and alkali nitrites.

9. Apparatus according to claim 5 additionally comprised of a single-effect evaporator; a means for heating said single-effect evaporator by said water vapor at delivery pressure; and a means for withdrawing water vapor at said initial pressure from said single-effect evaporator.

10. An apparatus for compressing a vapor from an initial pressure to a delivery pressure which is higher than the initial pressure by a pressure ratio of no more than about four, comprised of:
   (a) a two-stage generator comprising a higher pressure stage and a lower pressure stage;
   (b) a GAX exchanger composed of an absorption component and a desorption component;
   (c) a means for supplying part of the vapor at the initial pressure to the absorption component of the GAX exchanger;
   (d) a means for withdrawing part of the vapor at the delivery pressure from the desorption component of the GAX exchanger;
   (e) a means for withdrawing the remaining part of the vapor at the delivery pressure from the lower pressure stage of the two-stage generator; and (f) a means for heating the lower pressure stage of the two-stage generator by exchanging latent heat with vapor withdrawn from the higher pressure stage of the two-stage generator.

11. Apparatus according to claim 10 additionally comprised of an aqueous mixture evaporator which supplies the water vapor at the initial pressure to said GAX exchanger and receives the water vapor at the delivery pressure from both said lower pressure stage of the two-stage generator and said GAX exchanger.

12. A process for increasing the pressure of water vapor from an initial pressure to a delivery pressure which is higher than the initial pressure by a factor of about two or less, comprising:
 (a) absorbing part of said water vapor at the initial pressure in an aqueous absorbent solution to release a first quantity of heat;
 (b) absorbing the remaining part of said water vapor at the initial pressure into said aqueous absorbent solution from part a), thereby releasing a second quantity of heat;
 (c) raising the pressure of said aqueous absorbent solution from step b) to the delivery pressure, and applying said first quantity of heat to said pressurized aqueous absorbent solution thereby desorbing part of said water vapor at the delivery pressure; and
 (d) heating said aqueous absorbent solution from step c) from an external source thereby desorbing a remaining part of said water vapor at the delivery pressure.

13. Process according to claim 12 additionally comprising using said steam at the delivery pressure for concentrating an aqueous mixture by evaporation; and withdrawing said steam at the initial pressure from said evaporation step.

* * * * *